United States Patent
Farrow

[19]

[11] Patent Number: 5,870,442
[45] Date of Patent: Feb. 9, 1999

[54] TIMING RECOVERY ARRANGEMENT

[75] Inventor: Cecil William Farrow, Highlands, N.J.

[73] Assignee: Lucent Technologies Inc., Murray Hill, N.J.

[21] Appl. No.: 777,893

[22] Filed: Dec. 31, 1996

[51] Int. Cl.$^6$ .................................................. H04L 27/06
[52] U.S. Cl. ........................................... 375/355; 375/373
[58] Field of Search ..................................... 375/373, 371, 375/355, 344, 345; 327/155, 291

[56] References Cited

U.S. PATENT DOCUMENTS

| | | | |
|---|---|---|---|
| 4,768,208 | 8/1988 | Cornett ...................................... | 375/355 |
| 4,815,103 | 3/1989 | Cupo ......................................... | 375/355 |
| 4,896,334 | 1/1990 | Sayar ......................................... | 375/355 |
| 5,115,452 | 5/1992 | Cupo ......................................... | 375/371 |
| 5,278,865 | 1/1994 | Amrany et al. ............................ | 375/355 |
| 5,285,482 | 2/1994 | Sehier et al. .............................. | 375/371 |
| 5,524,126 | 6/1996 | Clewer et al. ............................. | 375/355 |
| 5,528,634 | 6/1996 | Griph et al. ............................... | 375/355 |
| 5,724,396 | 3/1998 | Claydon et al. ........................... | 375/355 |

*Primary Examiner*—Tesfaldet Bochure
*Assistant Examiner*—Bayard Emmanuel
*Attorney, Agent, or Firm*—Thomas Stafford

[57] ABSTRACT

Timing recovery circuits, automatic gain control circuits and the like, employ a so-called vector tracking filter (VTF) in conjunction with other timing recovery techniques. The VTF includes a complex filter with a time constant so long that it might be considered a leaky integrator. In operation, the VTF builds up an average vector (timing (gain estimate vector) having a direction that is the average of the estimated timing (gain) error, which is stored in the VTF. When an arbitrary timing (gain) correction is made, to the incoming signal, this causes a rotation of the timing (gain) estimate vector. In order to track this rotation, a comparable rotation is made to the stored timing (gain) estimate vector. This allows the stored timing (gain) estimate vector to build up, and at any time the stored timing (gain) estimate vector will be the same as if the current incoming phase had been constant for all previous time. Consequently, it is possible to use a very long time constant in the VTF for long-term steady timing (gain) and at the same time acquire timing (gain) fast. In one example, the length of the vector stored in the VTF is allowed to build up until it reaches the mean value of the incoming timing (gain) estimate.

5 Claims, 4 Drawing Sheets

TIMING RECOVERY ARRANGEMENT

RELATED APPLICATION

U.S. patent application Ser. No. 08/777,889 was filed concurrently herewith.

TECHNICAL FIELD

This invention relates to filter arrangements and, more particularly, to filters for use in timing recovery circuits, automatic gain control circuits or other arrangements that require tracking of data signals or the like.

BACKGROUND OF THE INVENTION

Filters that have been used in prior timing recovery circuits, automatic gain control circuits or the like, retained some memory of the past timing or gain error estimates. Such prior filters inevitably slow down the tracking of the timing or gain, or have so broad a band width as to allow the recovered timing (gain) to have considerable jitter. Indeed, in order to recover timing and the like from data signals with very low signal-to noise-ratio (SNR) it is necessary to do some narrow band filtering. This narrow band filtering is in conflict with a fast acquisition time. Attempts at overcoming these problems, typically employed a filter that used a so-called "gearshift" which after some initial start-up interval shifted the filter time constant from short, fast and noisy to long, slow and quiet. Use of such gearshift filters is undesirable because a significantly long time is required before the time constant shift is effected. Consequently, fast acquisition was compromised.

SUMMARY OF THE INVENTION

The problems and limitations of prior known filters employed in timing recovery circuits, automatic gain control circuits and the like, are overcome by employing a so-called vector tracking filter (VTF). The VTF includes a complex filter with a time constant so long that it might be considered a leaky integrator. In operation, the VTF builds up an average vector (timing (gain) estimate vector) having a direction that is the average of the estimated timing (gain) error, which is stored in the VTF. When the VTF is employed in an automatic gain control arrangement, the vector becomes a scalor and only the amplitude is tracked. When an arbitrary timing (gain) correction is made, to the incoming signal, this causes a rotation of the timing (gain) estimate vector. In order to track this rotation, a comparable rotation is made to the stored timing (gain) estimate vector. This allows the stored timing (gain) estimate vector to build up, and at any time the stored timing (gain) estimate vector will be the same as if the current incoming phase (amplitude) had been constant for all previous time. Consequently, it is possible to use a very long time constant in the VTF for long-term steady timing (gain) and at the same time acquire timing (gain) fast. In one example, the length of the vector stored in the VTF is allowed to build up until it reaches the mean value of the incoming timing (gain) estimate.

An advantage of using the VTF is that no gear shifting is required and fast acquisition is realized while employing a long time constant.

DETAILED DESCRIPTION

Figure 1:
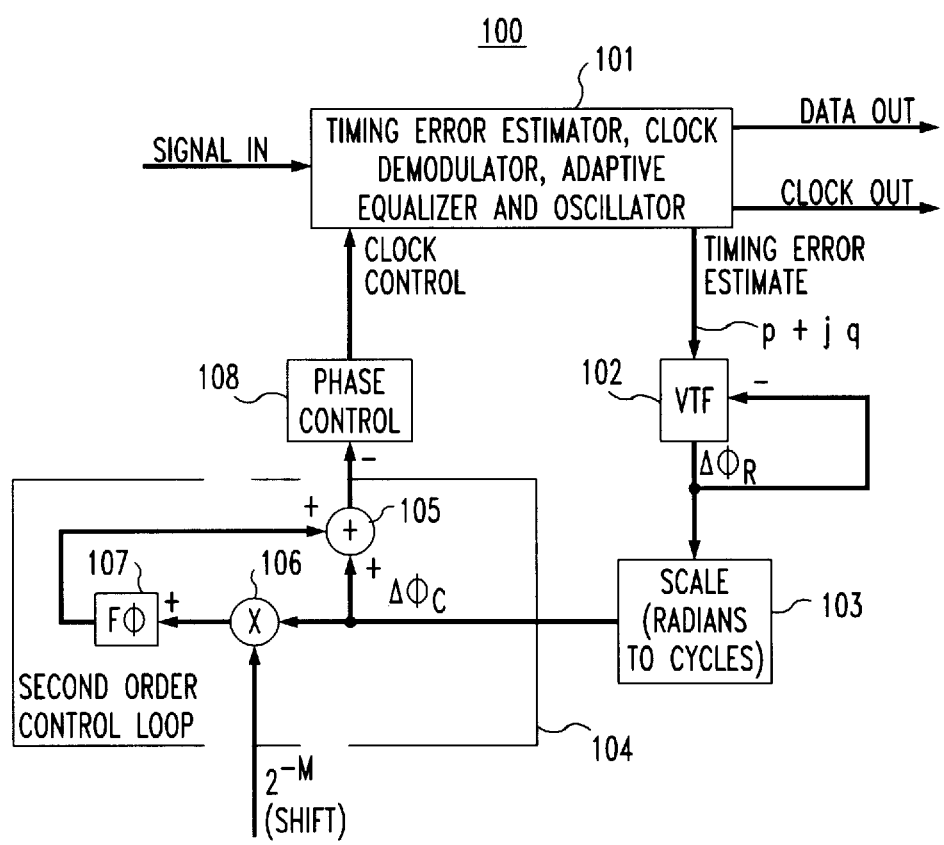
FIG. 1 shows in simplified block diagram form a generalized timing recovery arrangement employing a VTF in accordance with the invention.

FIG. 1 shows in simplified block diagram form a generalized timing recovery arrangement 100 employing a VTF, in accordance with the invention. As shown, timing recovery arrangement 100, in this example, includes unit 101 which for simplicity of explanation is comprised of the standard known elements of a timing recovery arrangement. Thus, unit 101 includes, for example, a timing error estimator, clock, demodulator, adaptive equalizer and oscillator. The timing error estimator may be for example, the one shown in FIG. 3 and described below. The VTF may be for example, either the one shown in FIG. 4 or the one shown in FIG. 7, both of which are described below. The oscillator may be for example, a VCO, VCXO, digital interpolator, add/delete unit or the like. In operation an incoming signal is supplied to unit 101, which generates the outgoing data, outgoing clock and timing estimate p+jq. The timing estimate is supplied to VTF 102 which, in turn generates $\Delta\Phi_R$ in radians. $\Delta\Phi_R$ is supplied to scaling unit 103 where $\Delta\Phi$ is scaled from radians to cycles to yield $\Delta\Phi_C$. In turn, $\Delta\Phi_C$ is supplied to second order control loop 104 and, therein, to multiplier 106 and summing unit 105. Also supplied to multiplier 106 is the constant $2^{-M}$ which is multiplied with $\Delta\Phi_C$ to yield in unit 107 F$\Phi$ which, in this example, is a small fraction $2^{-m}$ of $\Delta\Phi_C$, for example, $2^{-m} < \frac{1}{256}$. Then, F$\Phi$ is supplied to summing unit 105 where it is summed with $\Delta\Phi_C$ to yield an error signal that is supplied to phase control 108. The output of phase control 108 is the clock control signal which is used in well known fashion to control the oscillator and clock in unit 101.

Figure 2:
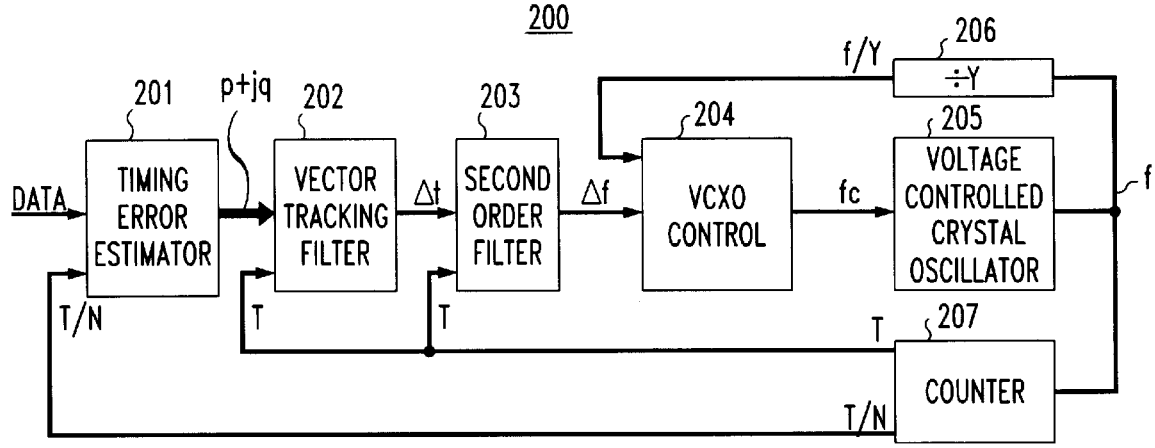
FIG. 2 shows in simplified block diagram form a more detailed timing recovery arrangement employing a VTF in accordance with the invention.
Figure 3:
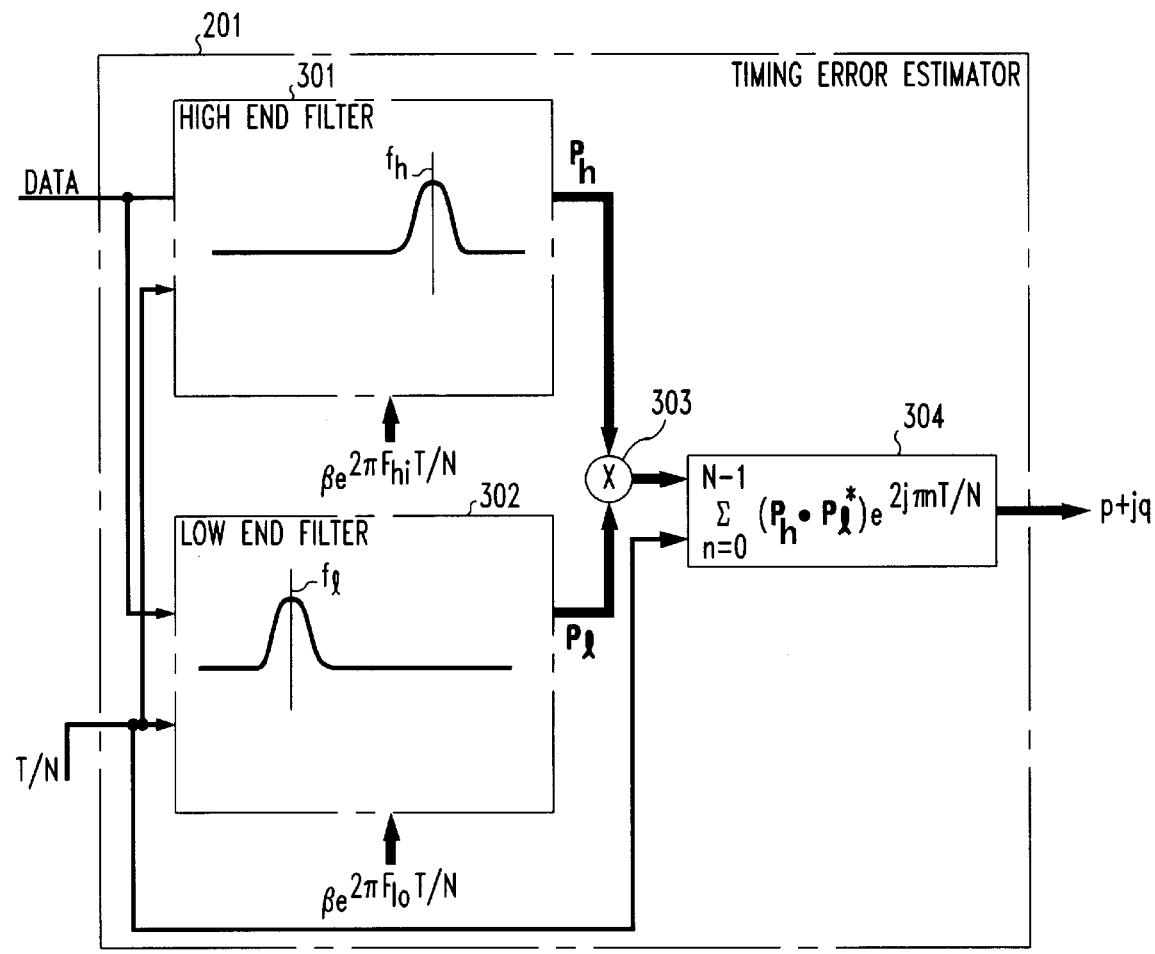
FIG. 3 shows in simplified block diagram form the timing error estimator employed in FIG. 2 and which can be employed in the embodiment of FIG. 1.
Figure 4:
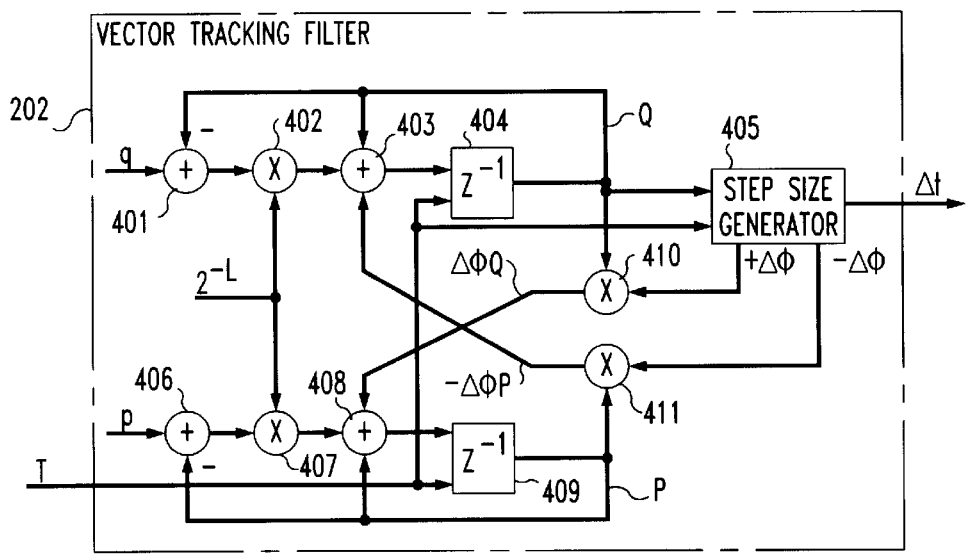
FIG. 4 shows in basic form a VTF which is employed in the embodiments of FIGS. 1 and 2.
Figure 7:
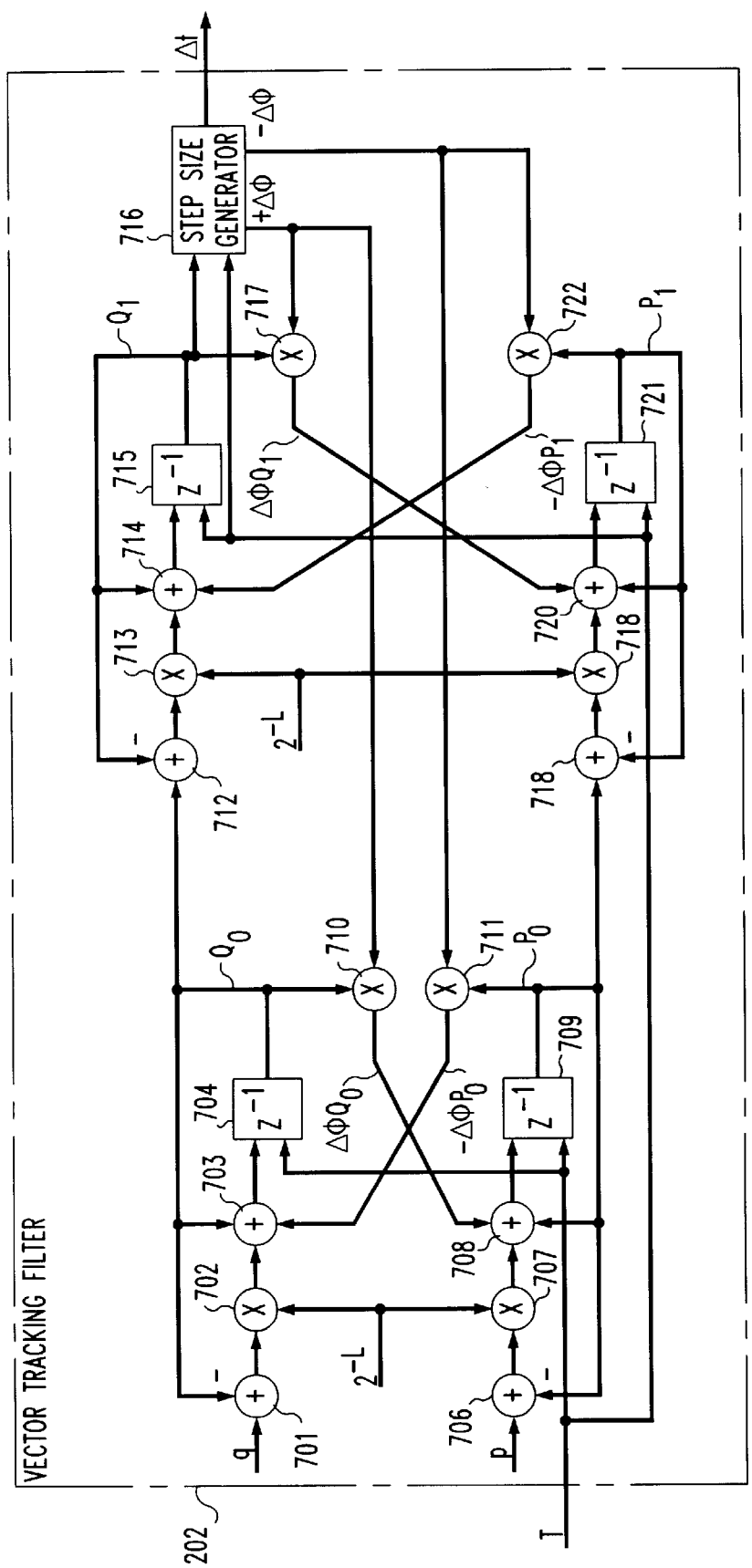
FIG. 7 shows in simplified form a two (2) stage VTF which may be employed in the embodiments of FIGS. 1 and 2.

FIG. 2 shows in simplified block diagram form timing recovery arrangement 100 which includes, in this example, timing error estimator 201, VTF 202, second order filter 203, voltage controlled crystal oscillator (VCXO) control 204, voltage control crystal oscillator (VCXO) 205, divider 206 and counter 207. Note that although a VCXO is employed in this example, other oscillator arrangements may equally be employed. Such arrangements include, but are not limited to, a voltage controlled oscillator (VCO), a digital interpolator (see for example my U.S. Pat. No. 4,866,647), add-delete arrangements or the like. As shown, a data signal (DATA) and a first clock signal (T/N) are supplied to timing error estimator 201. The data signal is one of a broad class of such data signals including, but not limited to, QAM, CAP, and the like. It should be noted that in high order QAM, as in 64 QAM, with very low excess bandwidth the timing information is weak and, therefore, the information is going to be very noisy. The first clock signal TIN is supplied from counter 207 and will be described below. An example of timing estimator 201 is shown in FIG. 3 and will be described in detail below. Timing estimator 201 generates an estimated timing vector p+jq, which is supplied as in input to VTF 202. Also supplied to VTF 202 is a second clock signal (T), typically at the baud rate, from counter 207. Details of one embodiment of VTF 202 are shown in FIG. 4 while details of a second two stage VTF are shown in FIG. 7 and described below. VTF 202 internally generates a filtered version of estimated timing vector p+jq, namely, P+jQ, which is utilized internally to generate a change in its representation of a change in step size, namely, $\Delta t$. Step size $\Delta t$ is supplied to second order filter 203 along with second clock signal T. Such second order filters are well known in the art. Second order filter 203 generates an updated version of step size $\Delta t$, namely, $\Delta f$ which is supplied as an input to VCXO control 204. VCXO control 204 is responsive to $\Delta f$ and to a modified version, namely, f/Y, of the frequency, f, output of voltage controlled crystal oscillator 205. VCXO control 204 generates control signal fc which is supplied as an input for controlling voltage controlled crystal oscillator 205, in known fashion. In turn, voltage controlled crystal oscillator 205 generates timing signal f at a desired frequency. Timing signal f is supplied to divider 206 and to counter 207. Divider 206 simply divides timing signal f by Y to yield signal f/Y. Note that signal f is divided by Y to reduce the speed in VCXO control 207. It should be further noted that counter 207 is employed, in known fashion, to generate timing signals T and T/N in response to timing signal f.

FIG. 3 shows in simplified block diagram form details of timing error estimator 201 employed in FIG. 2. Although FIG. 3 shows a specific implementation of timing error estimator 201, which can be advantageously employed in the timing recovery arrangement of FIGS. 1 and 2, it will be apparent to those skilled in the art that other implementations may be equally employed. As shown, the data signal is supplied to timing error estimator 501 and, therein, to a so-called high-end infinite impulse response (IIR) filter 301 and to low-end IIR filter 302. Such IIR filters are known in the art. High-end IIR filter 301 is responsive to the data signal, a predetermined constant $\beta e^{j2\pi F_{hi}T/N}$ and is driven by first clock signal T/N to yield complex filtered signal $P_h$, at the high band end frequency, as illustrated, where $P_h=p_h+jq_h$. Similarly, low-end IIR filter 302 is responsive to the data signal, a predetermined constant $\beta e^{j2\pi F_{lo}T/N}$ and is driven by first clock signal T/N to yield complex filtered signal $P_1$, at the low band end frequency as illustrated, where $P_1=p_1+jq_1$. Complex filter signals $P_h$ and $P_1$ are supplied to multiplier 303 which yields signal $P_h \cdot P_1^*$. In turn, signal $P_h \cdot P_1^*$ is supplied to averager 304. Averager 304 sums the signal $P_h \cdot P_1^*$ values according to $$\sum_{n=0}^{n-1} (P_h \cdot P_l^*)e^{2j\pi nT/N}$$

to yield N times the average of estimated timing vector p+jq over each symbol of the data signal. Note that p+jq is a complex sample estimate and is supplied to VTF 202.

FIG. 4 shows in simplified form details of one embodiment of VTF 202. The values of the real (p) and imaginary (q) parts of average estimated timing vector p+jq from timing error estimator 201 (FIG. 2) are obtained in well known fashion (not shown). The value of q of the imaginary part is supplied to one input of combining unit 401 and the value of the real part p is supplied to one input of combining unit 406. Output Q from $Z^{-1}$ transform unit 404 is supplied to a negative input of combining unit 401, to an input of combining unit 403, to step size generator 405 and to multiplier 410. Similarly, output P from $Z^{-1}$ transform unit 409 is supplied to a negative input of combining unit 406, to an input of combining unit 408, and to multiplier 411. Constant $2^{-L}$ is supplied to multipliers 402 and 407 to realize exponential smoothing of p and q, respectively. It should be noted that L should be as large as is practical. In one example L is 16. Combining unit 403 combines the output of multiplier 402, output Q from unit 404 and output $-\Delta\Phi P$ from multiplier 411 to form an input to $Z^{-1}$ standard delay unit 404 in Z transform (of one clock interval) and combining unit 408 combines the output of multiplier standard delay unit 407, output P from unit 409 and output $\Delta\Phi Q$ from multiplier 410 to form an input to $Z^{-1}$ standard delay unit 409 also in Z transform which, in turn, yields the smoothed values of p and q, namely, P and Q in this example, as indicated by the following relationships:

$P_n=P_{n-1}+2^{-L}(p_n-p_{n-1})$ and
$Q_n=Q_{n-1}+2^{-L}(q_n-Q_{n-1})$, respectively.

Then, to rotate the P, Q vector $\Delta\Phi$, which in this example is an integral step size, the following relationships are employed in this example:

$P_n=P_{n-1}+\Delta\Phi \cdot Q_{n-1}$ and
$Q_n=Q_{n-1}-\Delta\Phi \cdot P_{n-1}$, respectively.

The above equations for rotating vector P, Q are so-called small angle approximations. It can be shown that in these approximations the radial and angular errors are $\cong \Delta 101^2/2$, and $\cong \Delta\Phi^3/3$, respectively, in one example. All values of $\Delta\Phi$ can be powers of 2 so that all multiplies can be implemented utilizing shifts, thereby making it easier to implement the VTF on VLSI, an ASIC or DSP.

More specifically, in an embodiment of the VTF, the phase of the sampling clock is rotated in such a direction so as to reduce any estimated timing error. The current timing phase is then given by:

$\Phi_n = \Phi_{n-1} + \Delta_n$.

Without vector tracking the filter is updated as follows:

$$X_n = e^{j\phi_n} \cdot x_n + \beta X_{n-1} = \sum_k \beta^k \cdot (e^{j\phi_{n-k}} \cdot x_{n-k}),$$

and with vector tracking, the VTF is updated in accordance with the following:

$$X_n = e^{j\phi_n} \cdot x_n + e^{j\Delta_n} \cdot \beta \cdot X_{n-1} = e^{j\phi_n} \cdot \sum_k \beta \cdot x_{n-k},$$

where $\Delta n$ is the most current timing update, x=p+jq, X=P+jQ, $0<\alpha=(1-\beta)<<1$ and the time constant $\cong T/\alpha$.

From the above equations it can be seen that, using vector tracking, the filtered result depends only on $\Phi_n$ and the independent filter value of x, and is independent of the path taken to arrive there. Thus, if large steps are taken initially, i.e., at start up, they will not affect the filtering. Consequently, relatively fast convergence is obtained initially and a relatively quiet operation of the filter is realized over the long term by the combination of reducing the step size and the fact that the accumulation in the filter also reduces the angular noise.

A representation of Q is supplied to step-size generator 405 which yields $+\Delta\Phi$ that is supplied to multiplier 410 and $-\Delta\Phi$ which is supplied to generator 411. Details of step size generator 405 are described below regarding FIG. 5. Again, it should be noted that in one embodiment all values of $\Delta\Phi$ are fractional powers of 2, so that all multipliers can be implemented with shifts which makes it easier to implement the VTF on VLSI, an ASIC (application specific integrated circuit) or DSP (digital signal processor). Additionally, it should be noted that $\Delta\Phi$ is in radians and $\Delta t$ is in fractions of the sampling intervals. $\Delta t$ is representative of a control signal which, as indicated above, is supplied to second order filter 203 (FIG. 2) which generates in turn Δf for controlling VCXO control 204.

Furthermore, it is important to note that none of the past knowledge is lost. Indeed, once the vector is rotated and the VTF is in the steady state, it appears that the timing vector was at its rotated position all along, i. e., for all past time.

For proportional control of the timing recovery arrangement, we begin with $\Delta_n = k \cdot Q \cdot W$, where $$W = \frac{1}{\sqrt{P^2 + Q^2}}$$

and in one example $k=1/64$ and $\alpha=2^{-8}$, i. e., $\Delta_n$ is equal to $1/64$ times the SINE of the estimated angular error.

Then, in accordance employing the above noted timing filter updating equations without vector tracking and with vector tracking the incoming timing vector is filtered and a corresponding timing update is generated.

The computation for updating the timing filter without vector tracking lends itself easily for use with a DSP because P and Q are heavily filtered. Then, W can be readily updated as follows $W_n = W_{n-1} \cdot \{1 - [W_{n-1}^2 \cdot (P_n^2 + Q_n^2) - 1]\}/2$ by using "small angle" approximations, i.e., $\cos(x) \approx 1$, $\sin(x) \approx x$, the vector tracking update can be reduced to:

$P' = P_{n-1} + \alpha \cdot (p_n - P_{n-1})$ $Q' = Q_{n-1} + \alpha \cdot (q_n - Q_{n-1})$ and $P_n = P' + \Delta_n \cdot Q'$ $Q_n = Q' - \Delta_n \cdot P'$ Then, using the above reduced vector tracking equations, and making $\alpha$ and $\Delta_n$ powers of 2, it is possible to implement the VTF in silicon, using shifts instead of multiples. In the instance of $\alpha$, in one example a very long time constant, for example $\alpha=2^{-16}$ may be employed which amounts to a "leaky" integrator. The range of $\Delta_n$ may be, for example, $2^{-12} \leq \Delta_n \geq 2^{-16}$. The value of $\Delta_n$ is changed dynamically by reducing the value of $\Delta_n$ whenever the sign of Q changes, and increasing the value of $\Delta_n$ when the sign of Q stays the same. This would be done in such a way as to favor the small values of $\Delta_n$; thus ensuring in the long-term, timing step sizes will be very small and therefore the timing jitter will also be small.

Figure 5:
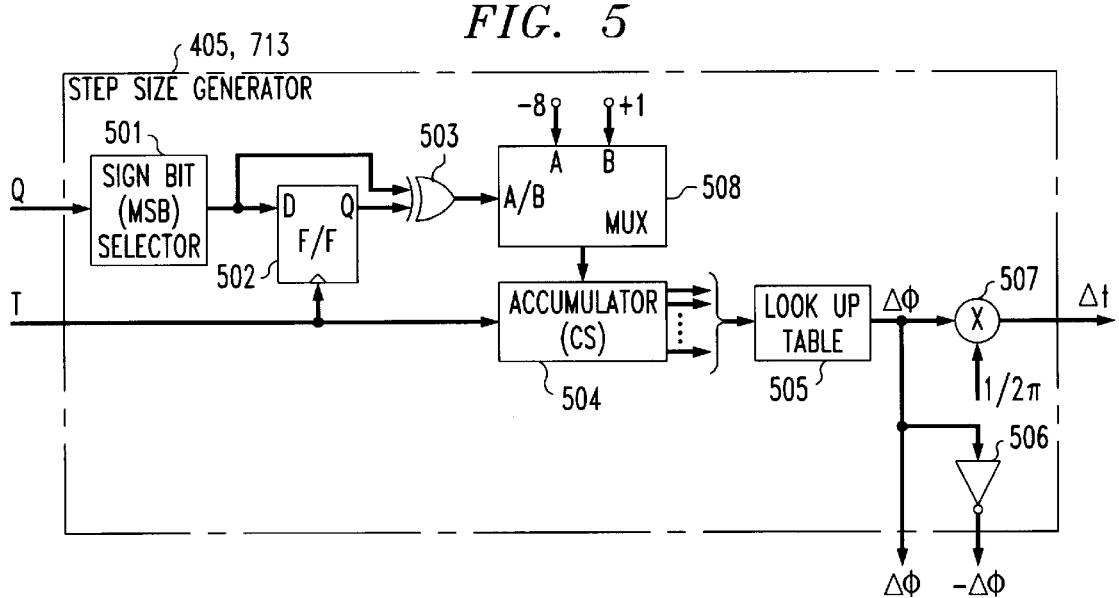
FIG. 5 shows in simplified form the step size generator employed in the VTF of FIG. 4.

FIG. 5 shows, in simplified block diagram form, details of step size generator 405 (716). As indicated above, Q is supplied to the step size generator and therein to sign bit (most significant bit) selector 501. The output of sign bit selector 501 is supplied to D-type flip-flop 502 which is employed to store it so that the Q output can be compared to the next received sign bit via exclusive OR gate 503. As is well known, if the next sign bit is different from the Q output of flip-flop 502, exclusive OR gate 503 will yield a logical 1 output and, if the Q output of flip-flop 502 is the same as the next sign bit, exclusive OR gate 503 will yield a logical 0 output. The output of exclusive OR gate 503 is supplied to the A/B select input of multiplexed (MUX) 508 to either select a first step size, for example, of –8, or a second step size, for example, of +1. Thus, when the output of exclusive OR gate is a logical 0, the +1 input to MUX 508 is selected to be supplied to accumulator 504 and, when the output of exclusive OR gate 503 is a logical 1, the –8 input is selected to be supplied to accumulator 504. Accumulator 504 is thus controlled by the output of MUX 508 to realize an adaptive rapid convergence to the desired values of ΔΦ and Δt, and once converged provides for a slower adaptation of those values. This is specifically shown in Table 1 below which indicates a plurality of step sizes from 0 through 255 at a step size of 16 for corresponding values of ΔΦ from $2^{-12}$ to $2^{-4}$ in one example. Table 1 is a look-up table which is stored in look-up table 505 to yield the desired value of ΔΦ. In turn, the value of ΔΦ is supplied as an output and also is supplied to inverter 506 to yield a value of –ΔΦ and to multiplier 507, where it is multiplied by $1/2\pi$ to yield the desired value of Δt. As indicated above, initially at start-up, the rotation is very rapid (in one example $1/16$ of a radian) and upon convergence the rotation becomes slow (i.e., the step size is small, for example $2^{-12}$).

TABLE 1

| | |
|---|---|
| 128–255 | Δφ = $2^{-4}$ |
| 112–127 | Δφ = $2^{-5}$ |
| 96–111 | Δφ = $2^{-6}$ |
| 80–95 | Δφ = $2^{-7}$ |
| 64–79 | Δφ = $2^{-8}$ |
| 48–63 | Δφ = $2^{-9}$ |
| 32–47 | Δφ = $2^{-10}$ |
| 16–31 | Δφ = $2^{-11}$ |
| 0–15 | Δφ = $2^{-12}$ |

Note that the step sizes are such as to bias accumulator 504 in the direction of going down and a number steps must be taken in an upward direction in order to cross to a higher level in TABLE 1. Operation of accumulator 504 is such that after carrier is detected, in one example, accumulator 504 is loaded with a large number, for example, 255, which causes a fast mode of convergence because the angle of rotation of the vector is larger. In this example, by the time the $\Delta\Phi=2^{-6}$ level is reached in TABLE 1 the VTF is very quite. By way of example, going from 255 to 128 normally would take less than 100 symbols. Thereafter, it would be 4 symbols between ΔΦ values.

Figure 6:
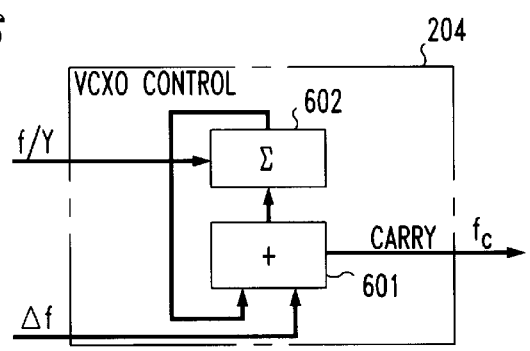
FIG. 6 shows in simplified block diagram form the VCXO control employed in FIG. 2.

FIG. 6 shows, in simplified block diagram form, details of VCXO control 204 of FIG. 2. Specifically, a representation of Δf is supplied to summing unit 601 along with an output from accumulator 602. Additionally, f/Y is supplied to accumulator 602 which is a clock input for the purposes of updating accumulator 602. Summer 601 is responsive to the representation of Δf and the output of accumulator 602 to yield carries. Thus, the output of VCXO control, namely $f_c$, is the control voltage for controlling voltage control crystal oscillator 205.

FIG. 7 shows, in simplified block diagram form, a multistage VTF that may also be employed in the embodiments of the invention. In this example, only two stages are shown although it would be apparent to those skilled in the art that other arrangements for rotating vectors will also track the desired phase value. Thus, shown in FIG. 7, are elements 701 through 722 for generating the desired value of Δt. It is noted that the two stages shown are essentially identical to the one stage VTF shown in FIG. 4 and will not be described again in detail. However, it is noted that in the two stage VTF only step size generator 716 is employed to yield Δt. Thus, outputs $Q_0$ and $P_0$ from the first stage are supplied to combiners 712 and 718, respectively.

What is claimed is:

1. A timing recovery arrangement comprising:
  a timing error estimator to which an incoming data signal is to be supplied, the timing error estimator generates a representation of an estimated timing error vector having a real part and an imaginary part;
  a vector tracking filter supplied with values of the real part and the imaginary part of the estimated timing error vector for tracking rotation of the estimated timing error vector in order to generate a signal representative of an error step size;

a filter supplied with the error step size signal to generate an updated version of the error step size;

a control element supplied with the updated error step size and a modified version of a signal representative of a frequency output from the timing recovery arrangement to generate a control signal; and a controllable oscillator responsive to the control signal for generating the signal representative of the frequency output wherein the vector tracking filter comprises:

a complex filter being supplied values of a real part and an imaginary part of an estimated error vector related to a characteristic of the incoming data signal, the complex filter including an element for generating an estimated vector having a direction that is the average of the estimated error vector, a storage element for storing the average estimated vector and an element for tracking a rotation in the estimated error vector and making a comparable rotation in the stored average estimated vector, wherein the stored average estimated vector increases so that a relatively long time constant can be used in the complex filter for long-term steady state operation and at the same time acquiring the steady state relatively rapidly.

2. The timing recovery arrangement of claim 1 wherein the element for tracking causes a relatively rapid convergence by rotating at a rapid rate and upon convergence rotating at a relatively slow rate.

3. The timing recovery arrangement of claim 1 wherein the tracking element includes a step size generator which is biased in a prescribed manner to achieve the rapid rotation during convergence and the slow rotation upon achieving convergence.

4. The timing recovery arrangement of claim 3 wherein the complex filter further includes elements for generating a filtered versions of the real part and the imaginary part of the estimated error vector, and wherein the step size generator is responsive to the filtered version of the imaginary part to generate a desired step size.

5. The timing recovery arrangement of claim 3 wherein the complex filter further includes elements for generating a filtered versions of the real part and the imaginary part of the estimated error vector, and wherein the step size generator is responsive to the filtered version of the imaginary part to generate a desired step size.

* * * * *